US012204284B2

(12) United States Patent
Willemin et al.

(10) Patent No.: US 12,204,284 B2
(45) Date of Patent: Jan. 21, 2025

(54) DEVICE FOR DISPLAYING THE MOON ON DEMAND

(71) Applicant: The Swatch Group Research and Development Ltd, Marin (CH)

(72) Inventors: Michel Willemin, Preles (CH); Simon Springer, Berne (CH); Jean-Jacques Born, Merges (CH)

(73) Assignee: The Swatch Group Research and Development Ltd, Marin (CH)

( * ) Notice: Subject to any disclaimer, the term of this patent is extended or adjusted under 35 U.S.C. 154(b) by 375 days.

(21) Appl. No.: 17/771,977

(22) PCT Filed: Nov. 5, 2020

(86) PCT No.: PCT/EP2020/081174
§ 371 (c)(1),
(2) Date: Apr. 26, 2022

(87) PCT Pub. No.: WO2021/089722
PCT Pub. Date: May 14, 2021

(65) Prior Publication Data
US 2022/0365486 A1 Nov. 17, 2022

(30) Foreign Application Priority Data
Nov. 5, 2019 (EP) .................................... 19207242

(51) Int. Cl.
*G04B 19/26* (2006.01)

(52) U.S. Cl.
CPC .................................. *G04B 19/268* (2013.01)

(58) Field of Classification Search
CPC .............................. G04B 19/268; G04B 19/26
See application file for complete search history.

(56) References Cited

U.S. PATENT DOCUMENTS 1,126,214 A * 1/1915 Herschede ........... G04B 19/268 968/210
2,278,520 A * 4/1942 Pfeffer .................. G04B 19/30 116/DIG. 5
3,270,201 A * 8/1966 Hardesty ................. G09F 13/20 368/227

(Continued)

FOREIGN PATENT DOCUMENTS

CH 672 223 A3 11/1989
CH 713 590 A2 9/2018

(Continued)

OTHER PUBLICATIONS

International Search Report for PCT/EP2020/081174, dated Jun. 21, 2021.

*Primary Examiner* — Edwin A. Leon
*Assistant Examiner* — Sean R Brannon
(74) *Attorney, Agent, or Firm* — Sughrue Mion, PLLC

(57) ABSTRACT

The present invention relates to a device (100) for displaying the moon for a timepiece on demand. The display device (100) including a first movable indicator member (110) and having a representation of the moon (111). This representation of the moon (111) is completely or partially occulted by an occulting element (121) that is located on a second movable indicator member (120) when the user so requests and in particular via a control unit.

14 Claims, 4 Drawing Sheets

(56) References Cited

U.S. PATENT DOCUMENTS

| | | | | |
|---|---|---|---|---|
| 4,711,583 | A * | 12/1987 | Oechslin | G04B 13/008 968/207 |
| 4,881,213 | A * | 11/1989 | Zaslawsky | G04B 19/268 968/210 |
| 5,500,835 | A * | 3/1996 | Born | G04C 3/146 368/11 |
| 6,272,076 | B1 | 8/2001 | Dinger | |
| 2003/0189875 | A1 * | 10/2003 | Wilmouth | G04B 37/0058 368/17 |
| 2004/0156269 | A1 * | 8/2004 | Plange | G04B 19/268 368/17 |
| 2004/0223413 | A1 * | 11/2004 | Rey-Mermet | G04B 19/268 368/18 |
| 2005/0094491 | A1 * | 5/2005 | Wallace | G04B 19/268 368/15 |
| 2006/0007787 | A1 * | 1/2006 | Born | G04B 19/268 368/15 |
| 2009/0003137 | A1 | 1/2009 | Courvoisier et al. | |
| 2015/0261190 | A1 * | 9/2015 | Danthe | G04B 45/02 368/294 |
| 2018/0004162 | A1 * | 1/2018 | Capt | G04B 19/268 |
| 2018/0267474 | A1 * | 9/2018 | Lagorgette | G04B 19/268 |

FOREIGN PATENT DOCUMENTS

| | | | |
|---|---|---|---|
| EP | 1 708 054 | A1 | 10/2006 |
| EP | 3 477 402 | A2 | 5/2019 |
| JP | 2000-65958 | A | 3/2000 |
| JP | 2009-8678 | A | 1/2009 |
| JP | 2012-198030 | A | 10/2012 |
| JP | 2018-155747 | A | 10/2018 |

* cited by examiner

DEVICE FOR DISPLAYING THE MOON ON DEMAND

CROSS REFERENCE TO RELATED APPLICATIONS

This application is a National Stage of International Application No. PCT/EP2020/081174 filed Nov. 5, 2020, claiming priority based on European Patent application Ser. No. 19/207,242.9 filed Nov. 5, 2019, the entire contents of which are incorporated herein by reference.

TECHNICAL FIELD

The present invention relates to the field of watchmaking and more particularly the representation of the phases of the moon. Preferably, the present invention relates to the representation of the phase of the moon as requested by the user and/or according to certain parameters.

TECHNOLOGICAL BACKGROUND

Traditionally, the phase of the moon is indicated with a disc under the dial that includes 2 printed moons. The opening in the dial makes it possible to visually represent the phase of the moon and a graduation of 0 to 29.5 to read the age of the moon.

Lunation is the interval of time separating two new moons and the mean duration thereof is 29 days 12 hours 44 minutes and 2.8 seconds. In a mechanical watch the disc makes one turn in 59 days. As there is a difference with the lunation, it is necessary to regularly correct the position of this disc. This is because these mechanisms, highly sophisticated, nevertheless lack precision on the one hand since the phase of the moon is modified only when 24 hours have passed and on the other hand these mechanisms do not take into account the position of the user, since the representation of lunation is different depending on whether the user is located in the northern hemisphere or in the southern hemisphere.

The idea of this patent is to simplify the mechanism for indicating the phase of the moon by using the hour and minute hands of an electronic watch.

SUMMARY OF THE INVENTION

The aim of the present invention is to solve all or some of the drawbacks mentioned above in the form of a display device for a timepiece and preferably on demand; said display device comprising at least:

- a first indicator member: said at least one first indicator member preferably being mounted so as to be able to move and comprising at least one representation of the moon;
- a second indicator member: said at least one second indicator member preferably being mounted so as to be able to move and including at least one occulting element configured for occulting said at least one representation of the moon;
- a first driver: said at least one first driver configured for driving said at least one first indicator member and/or said at least one second indicator member; and
- a control unit: said at least one control unit being configured for controlling, according to a set of data, said at least one first driver so as to drive and/or to superimpose said at least one first indicator member and/or said at least one second indicator member so that said at least one representation of the moon is completely or partially occulted by said at least one occulting element.

Thanks to this arrangement, the lunations are represented without a space on the dial being especially dedicated to them, and moreover the display device enables the user to have a dynamic and the most faithful representation of the moon, according to the time and date, but also according to the hemisphere preselected by the wearer.

According to a preferred embodiment, said at least one control unit controls said at least one first driver at the request of the user.

According to one embodiment, said set of data includes at least:

- a date;
- a time; and/or
- a geographical position.

Thanks to this arrangement, the lunations are shown to the user in the most faithful manner according to the moment and/or the place where the user requested it.

According to one embodiment, the set of data is received by said at least one control unit via communication by radio frequency, via satellite geopositioning, and/or via wireless and/or light communication.

Thanks to this arrangement, the lunations are shown to the user in the most faithful manner according to the moment and/or the place where the user requested it.

According to one embodiment, said display device comprises at least one second driver configured for driving said at least one second indicator member.

Thanks to this arrangement, said at least one first driver and said at least one second driver can move said at least one first indicator member and said at least one second indicator member independently on the one hand, and on the other hand this making the indication system more effective and more economical from an energy point of view.

According to one embodiment, said at least one representation of the moon is lighter than said at least one occulting element, and/or said at least one occulting element and/or said at least one representation of the moon has or have a rounded, round, elliptical, disc and/or spherical shape.

According to one embodiment, said at least one occulting element is darker than said at least one representation of the moon.

Thanks to this arrangement, said at least one representation of the moon approaches reality.

According to one embodiment, said at least one occulting element comprises at least one opening configured for completely or partially revealing said at least one representation of the moon.

Thanks to this arrangement, said at least one representation of the moon approaches reality.

According to one embodiment, said at least one representation of the moon comprises at least one opening configured for completely or partially revealing a watch dial so as to represent the moon.

According to one embodiment, said at least one representation of the moon and/or said at least one occulting element comprises or comprise a polarised material, in particular with a mirror, semi-transparent and/or transparent effect.

Thanks to this arrangement, said at least one representation of the moon and/or said at least one occulting element is or are not or is or are only slightly visible to the user.

According to one embodiment, said at least one representation of the moon comprises a material that is shiny, reflective, luminescent or photoluminescent and/or is made from barium sulfate, and/or said at least one occulting element comprises a material that is matt, photoabsorbent or made from carbon and/or carbon nanotube.

Thanks to this arrangement, said at least one representation of the moon reflects or diffuses the light like the moon and/or said at least one occulting element absorbs light.

According to one embodiment, said at least one representation of the moon and/or said at least one occulting element comprises or comprise a liquid crystal, electrochromic and/or electrowetting display configured for modifying the transparency of said at least one representation of the moon and/or of said at least one occulting element so that, when said at least one representation of the moon and said at least one occulting element are superimposed, a representation of the lunar phase appears to the observer.

Thanks to this arrangement, said at least one representation of the moon or of and/or said at least one occulting element reveals or reveal a lunation only when the user so wishes and not when said at least one first indicator member and said at least one second indicator member intersect.

According to one embodiment, said at least one control unit being configured for controlling said at least one first driver so as to drive said at least one first indicator member completely or partially under said at least one second indicator member so that said at least one representation of the moon is completely or partially occulted by said at least one occulting element, or so as to drive said at least one second indicator member completely or partially above said at least one first indicator member so that said at least one representation of the moon is completely or partially occulted by said at least one occulting element.

Thanks to this arrangement, the lunations are shown without a space on the dial being especially dedicated to them, and moreover the display device enables the user to have a dynamic and the most faithful representation of the moon.

According to one embodiment, said at least one first indicator member is able to move about a first rotation axis and comprises a first proximal end close to said first rotation axis and/or a first distal end distant from said first rotation axis, and/or wherein said at least one second indicator member is able to move about a second rotation axis and comprises a second proximal end close to said second rotation axis and/or a second distal end distant from said second rotation axis; said at least one representation of the moon being at said first distal end or at said first proximal end and/or said at least one occulting element being at said second distal end or at said second proximal end.

Thanks to this arrangement, the lunations are shown at the end of said end or ends of said at least one first indicator member and/or at least one second indicator member.

According to one embodiment, said at least one first indicator member or said at least one second indicator member is configured for indicating the age of the moon.

Thanks to this arrangement, the user knows the age of the moon.

According to one embodiment, said at least one first indicator member or said at least second indicator member is configured for indicating the position of the moon with respect to the horizon, the rising time of the moon and the setting time of the moon.

Thanks to this arrangement, said at least one first indicator member or said at least one second indicator member According to one embodiment, said at least one first indicator member is the hour hand or the minute hand and/or said at least one second indicator member is the minute hand or the hour hand.

Thanks to this arrangement, the lunations are shown without a space on the dial being especially dedicated to them, while using elements already present.

According to one embodiment, said display device comprises a second hand indicating the age of the moon and being driven by said at least one first driver and/or said at least one second driver and/or by at least one third driver.

Thanks to this arrangement, the lunations are shown without a space on the dial being especially dedicated to them, while using elements already present.

According to one embodiment, the display device comprises an aperture configured for indicating the date of the day and/or the age of the moon when the user so requests.

BRIEF DESCRIPTION OF THE FIGURES

The invention will be described below in more detail by means of the accompanying drawings, given by way of in no way limitative examples, wherein.

In the following detailed description of the figures defined above, the same elements or the elements fulfilling identical functions can keep the same references so as to simplify understanding of the invention. Moreover, the term "user" must be understood as a concept including users of the feminine sex, of the masculine sex or others, and should not be limited.

DETAILED DESCRIPTION OF THE INVENTION

The present invention makes it possible to simplify the engineering and to improve the quality of the information for indicating the phase of the moon by using the hour and minute hands of an electronic watch, for example.

A disc representing the moon can be placed at the rear of the hour hand and a disc that can conceal the moon to a greater or lesser extent can be placed at the rear of the minute hand. In normal mode, the hands can indicate the time and, on demand, for example by pressing a button or the crown, the hands can move and the superimposition of the discs can indicate the phase of the moon at the time and date of the watch.

Indeed, the present invention makes it possible to show the lunations at the request of the user according to the time and date but also by taking into account optionally the geographical position of the user thanks to a display device 100 enabling the user to know the phase of the moon at a given instant and at a given place, on demand. This display device 100 can also be applied to the lunar or solar eclipses.

Figure 1:
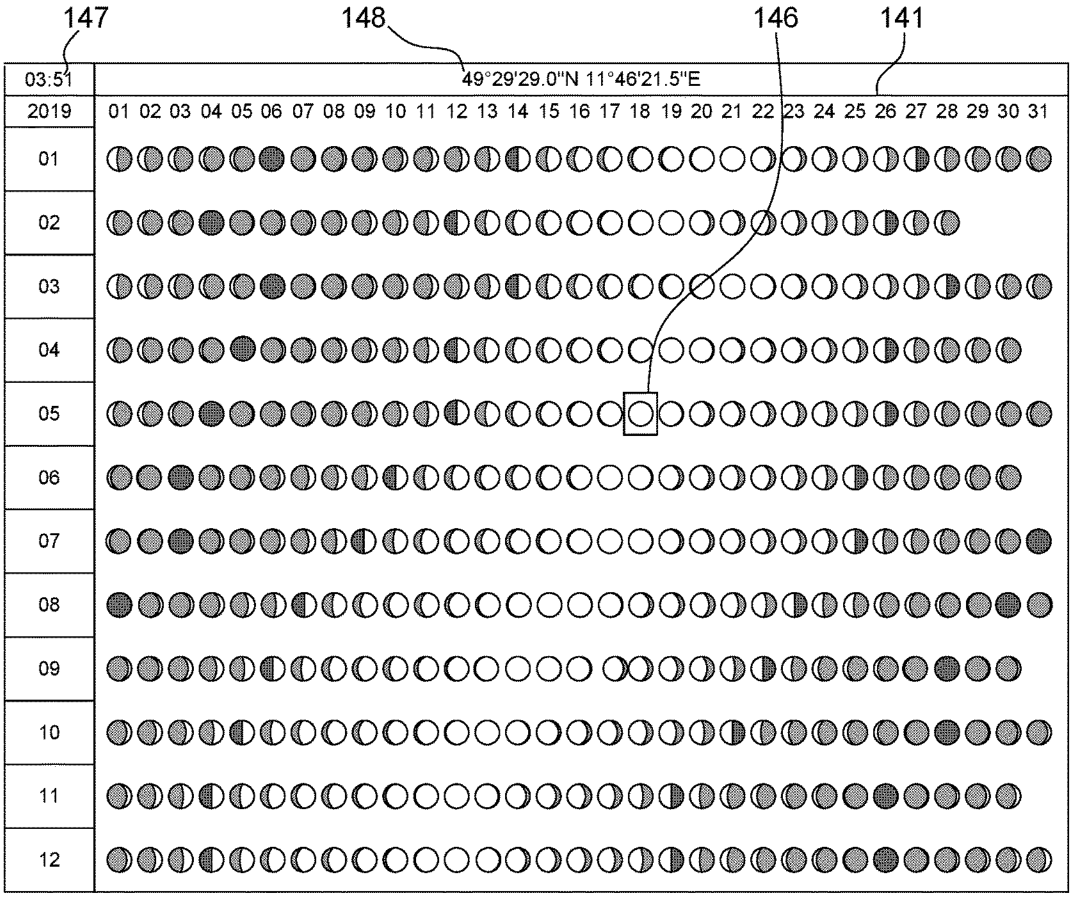
FIG. 1 shows an overall example of data 141 comprising phases of the moon according to the position of the user 148, the time and the date according to one embodiment.

Moreover, the lunations are shown without a space on the dial 199 being especially dedicated to them, and moreover the display device 100 enables the user to have a dynamic and most faithful representation of the moon according to a set of data as shown on FIG. 1.

The display device 100 can, indeed, show the lunations by means of at least one first indicator member 110 and at least one second indicator member 120 when they are superimposed.

Said at least one first indicator member 110 can be mounted so as to be able to move about a first rotation axis and can comprise a first proximal end 116 close to said first rotation axis and/or a first distal end 117 distant from said first rotation axis, on which at least one representation of the moon 111 can be found, i.e. either at said first distal end 117 or at said first proximal end 116.

Said at least one second indicator member 120 may also be mounted so as to be able to move about said first rotation axis or a second rotation axis, preferably coaxial with said first rotation axis, and may comprise a second proximal end 126 close to said first rotation axis and/or said second rotation axis and/or a second distal end 127 distant from said first rotation axis and/or from said second rotation axis, on which at least one occulting element 121 can be disposed, i.e. either at said second distal end 127 or at said second proximal end 126.

Typically, said at least one first indicator member 110 can take the form of an hour or minute hand and/or said at least one second indicator member 120 may be a minute or hour hand respectively and thus no space on the dial 199 is especially dedicated to the lunations on the one hand, and on the other hand elements already present, such as the hands, are used.

When said at least one first indicator member 110 and said at least one occulting element 121 are superimposed, said at least one occulting element 121 can be configured to occult said at least one representation of the moon 111.

According to the embodiments, the latter, i.e. said at least one representation of the moon 111 can appear lighter than said at least one occulting element 121, by comprising a bright, reflective, luminescent and/or photoluminescent material, for example made from barium sulfate, or from strontium aluminate, better known by the term Superluminova, and/or said at least one occulting element 121 can appear darker than said at least one representation of the moon 111 by comprising a matt or photoabsorbent material, for example made from carbon and/or carbon nanotubes, so that said at least one representation of the moon 111 reflects or diffuses light in the manner of the moon and/or said at least one occulting element 121 absorbs or masks light.

Obviously the present invention could not be confined to these embodiments since said at least one representation of the moon 111 and/or said at least one occulting element 121 may comprise a polarised material, in particular with a mirror effect and/or preferably transparent effect, so that, when said at least one representation of the moon 111 and said at least one occulting element 121 are not superimposed, said at least one representation of the moon 111 and/or said at least one occulting element 121 is or are not or is or are only slightly visible to the user, and when they are superimposed the lunation appears to the user.

Other embodiments can also be envisaged since said at least one representation of the moon 111 and/or said at least one occulting element 121 may comprise a liquid-crystal, electrochemical and/or electrowetting display configured for modifying the transparency of said at least one representation of the moon 111 and/or of said at least one occulting element 121 so that, when said at least one representation of the moon 111 and said at least one occulting element 121 are superimposed, a representation of the lunar phase appears to the observer.

In this case, said at least on representation of the moon 111 and/or said at least one occulting element 121 reveals or reveal a lunation only when the user so wishes and not when said at least one first indicator member 110 and said at least one second indicator member 120 intersect. This is because, when said at least one representation of the moon 111 and/or said at least one occulting element 121 may comprise a liquid-crystal, electrochemical and/or electrowetting display, said at least one representation of the moon 111 and at least one occulting element 121 show the phase of the moon only when the user so requests and when a current and/or a voltage is applied to said at least one representation of the moon 111 and/or to said at least occulting element 121. This is because said at least one representation of the moon 111 and/or said at least one occulting element 121 may comprise a liquid-crystal, electrochemical and/or electrowetting display whereas said at least one occulting element 121 or said at least one representation of the moon 111 may comprise a polarising material and thus the combination of the two shows a lunation.

Figure 9A:
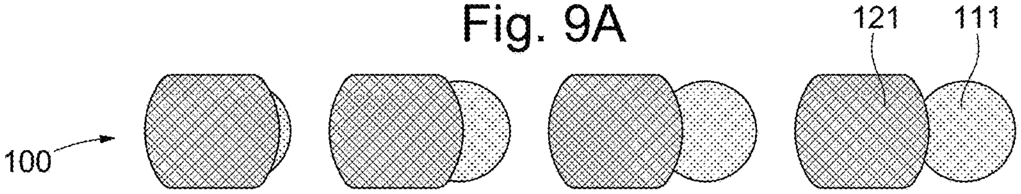
Figure 9B:
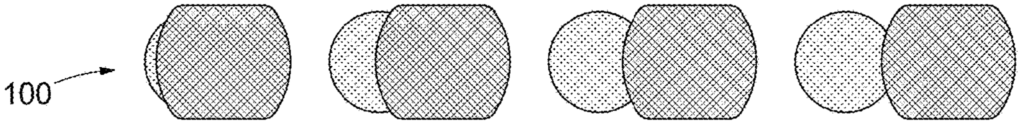

The form may also be important, according to the embodiments, since said at least one occulting element 121 and/or said at least one representation of the moon 111 may have a rounded, round, elliptical, disc and/or spherical form so that the lunation approaches reality, and on FIGS. 9A and 9B, when said at least one occulting element 121 occults said at least one representation of the moon 111.

In these embodiments, said at least one representation of the moon 111 may be implemented in a very noble material, such as gold, platinum or titanium on the one hand or quite simply brass, steel and aluminium on the other hand, with possibly a deposit of colour in a thin layer to best mimic the lunar colour, the dimensions, such as the weight, length, width and thickness, are defined so as to have a barycentre or a centre of gravity as close as possible to said first axis. With regard to said at least one occulting element 121, this, i.e. said at least one occulting element 121, may optionally be produced from a very noble material and the dimensions may also be defined so as to have a barycentre or a centre of gravity as close as possible to said first axis and/or said second axis.

As can be observed on FIGS. 7A, 7B, 8A and 8B, said at least one occulting element 121 may comprise at least one opening 122 configured for completely or partially revealing said at least one representation of the moon 111.

Figure 6:
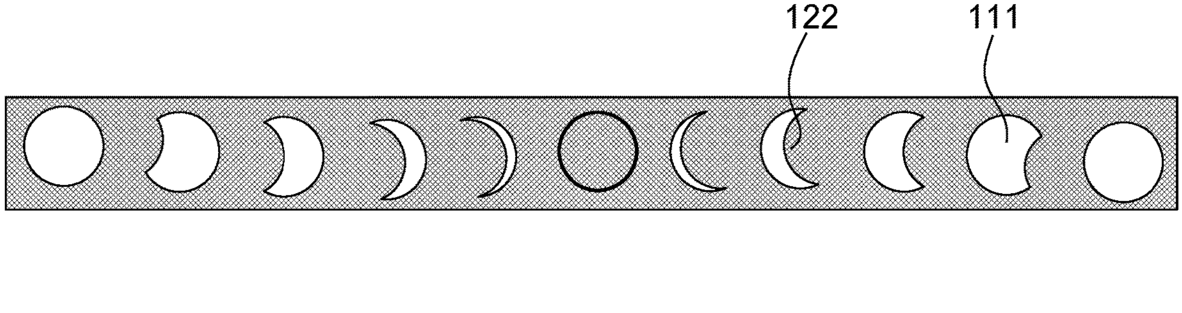
FIG. 6 shows schematically the breakdown of the phases of a solar eclipse and respectively of a lunar eclipse according to one embodiment.
Figure 7A:
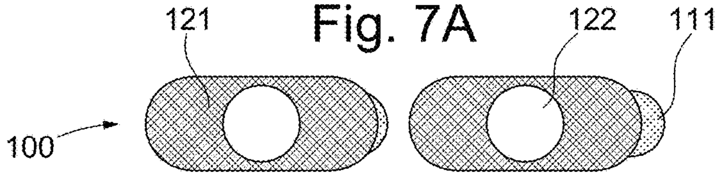
FIGS. 7A to 9B show the various forms and relative positions of said representation of the moon 111 and of said occulting element 121.
Figure 7B:
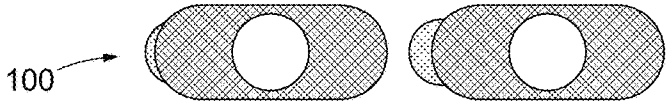
Figure 8A:
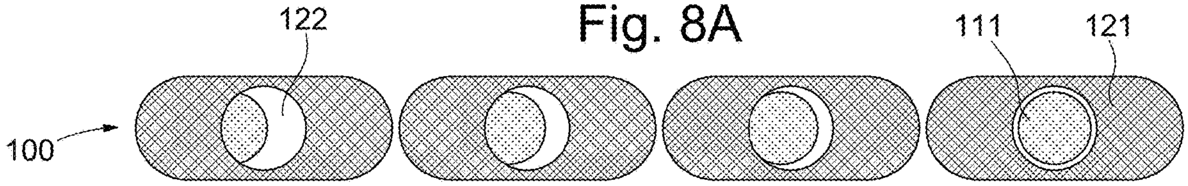
Figure 8B:
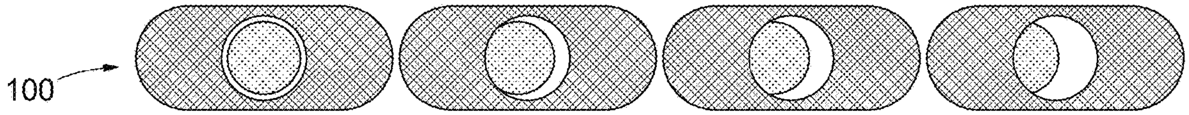

Moreover, it is completely possible for said at least one representation of the moon 111 to comprise at least one opening configured for completely or partially revealing the watch dial 199 so as to show the moon or the sun. Indeed, according to the embodiments, a solar or lunar eclipse may be shown, as can be observed on FIGS. 6A and respectively 6B. On this figure, said at least one first indicator member

110 and/or said at least one second indicator member 120 moves or move throughout the duration of the eclipse for example.

The mobility of said at least one first indicator member 110 and/or of said at least one second indicator member 120 is allowed by means of the at least one first driver, preferably an electric motor or a controlled stepping motor, configured for driving said at least one first indicator member 110 and/or said at least one second indicator member 120 according to the embodiments.

This is because, according to the embodiments, only at least one first driver can drive said at least one first indicator member 110 and at least one second indicator member 120 or each of said at least one first indicator member 110 and at least one second indicator member 120 can have respectively said at least one first driver and at least one second driver, preferably an electric motor or a controlled stepping motor, so that said at least one first driver and said at least one second driver can move said at least one first indicator member 110 and said at least one second indicator member 120 independently. This arrangement also makes it possible to simplify the mechanism since said at least one first driver and said at least one second driver can be controlled independently of each other. In addition, the reactivity of the display on demand is improved, just as the power consumption of the function is reduced.

The control of said at least one first indicator member 110 and/or of said at least one second indicator member 120, and more particularly of said at least one first driver and/or of said at least one second driver, can be achieved by means of at least one control unit.

Said at least one control unit may typically take the form of a processor, microcontroller, microprocessor or integrated circuit dedicated to controlling said at least one first driver and/or said at least one second driver.

Said at least one control unit is configured for controlling, according to a set of data 141 shown on FIG. 1, said at least one first driver and/or said at least one second driver so as to drive and/or to superimpose said at least one first indicator member 110 and/or said at least one second indicator member 120 and so that said at least one representation of the moon 111 is completely or partially occulted by said at least one occulting element 121.

This is because the superimposition of said at least one first indicator member 110 and of said at least one second indicator member 120 may be dependent on a set of data 141 such as the time, the date, for example 18 May 2019, by means of a perpetual calendar that the watch has available or by means of said set of data 141 received by said at least one control unit via a radio-frequency communication, via satellite geopositioning, and/or via wireless and/or light communication, so that the lunations are shown to the user in the most faithful manner possible according to the moment, i.e. a date and time, and/or the selected place where the user requested it.

Thus, according to the time at which the user requests the display device to display the representation of the lunation, for example 03:51, wherein said at least one first indicator member 110 indicates approximately 3 hours and said at least one second indicator member 120 indicates approximately 51 minutes, said at least one first indicator member 110 can remain immobile, for the time taken to display the lunation, so that said at least one first driver or said at least one second driver drives said at least one second indicator member 121 in proximity to said at least one first indicator member 110 so as to show a full moon as indicated on FIG. 1.

In addition, it is also possible for the display device 100 to show a solar or lunar eclipse according to said set of data 141 except that it will comprise either data transmitted by a communication means mentioned above or which would be recorded on an internal memory belonging to said processor, microcontroller, microprocessor or integrated circuit.

Figure 2:
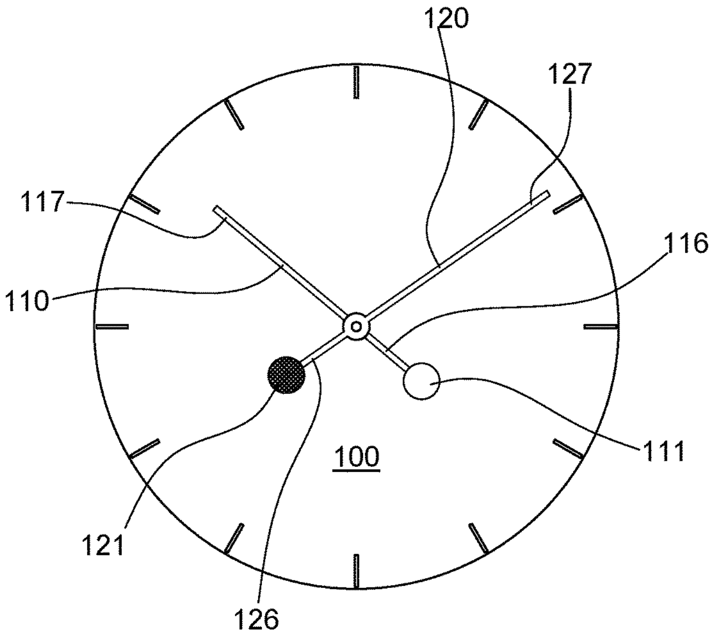
FIG. 2 illustrates an example of a dial with a first indicator member 110 including a representation of the moon 111 and a second indicator member 120 comprising an occulting element 121 according to one embodiment.
Figure 3:
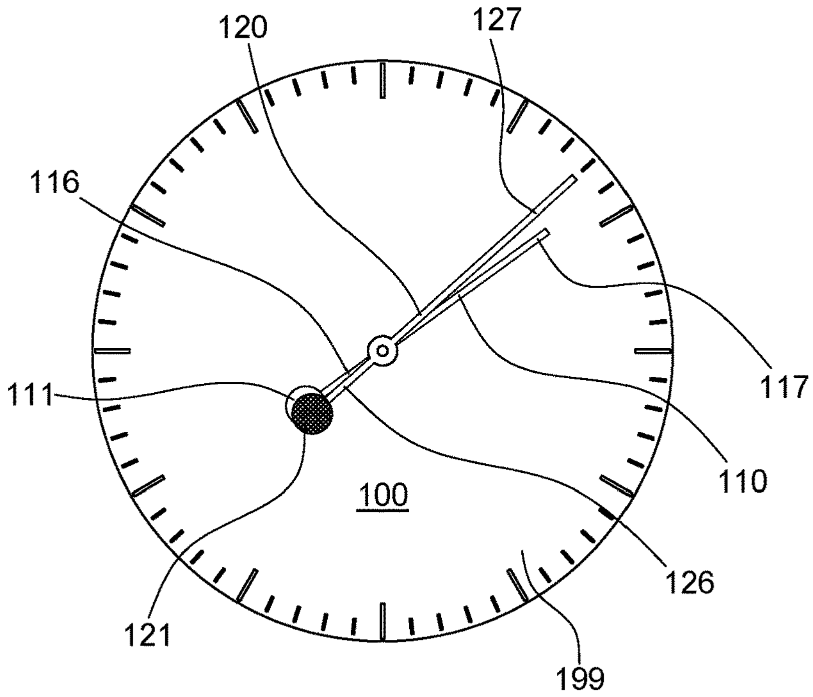
FIG. 3 presents said first indicator member 110 and said second indicator member 120 superimposed so that said representation of the moon 111 is occulted by said occulting element 121 according to one embodiment.
Figure 4:
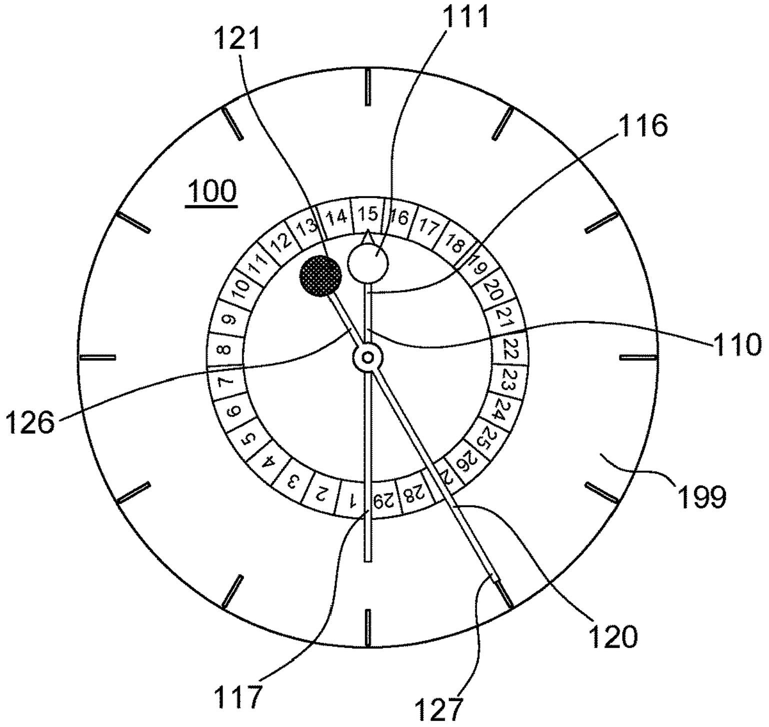
FIG. 4 shows said first indicator member 110 indicating the age of the moon while indicating the corresponding phase of the moon according to one embodiment.

It is also possible for said at least one first indicator member 110 or at least one second indicator member 120 to be able to move from their initial position, shown in FIG. 2, to an intermediate position that could indicate a direction, see FIG. 3, and/or the age of the moon, see FIG. 3 or 4.

Indeed, in addition to the phase, it is possible to indicate the age of the moon, which may be 8 on FIGS. 3 and 15 on FIG. 4, for example.

More exactly, it is the hour, minute or second hand that can indicate the age of the moon so that the lunations are shown without a space on the dial 199 being especially dedicated to them, and while using elements already present.

Moreover, the display device may comprise an aperture 195 configured for indicating the date 146 of the day and/or the age of the moon when the user so requests or the number of days remaining until the new moon or full moon according to the requirements of the user.

As illustrated on FIG. 4, if said at least one first indicator member 110 or said at least one second indicator member 120 is configured for indicating the age of the moon, a scale and/or a graduation will be indicated on the dial and/or on the bezel.

According to another embodiment, said set of data 141 may include at least other indications, such as for example the geographical position 148 of the user, which the latter has entered manually or by means of a geosatellite positioning, 49°29'29.0"N 11°46'21.5"E for example, so that the lunations are shown to the user in the most faithful manner possible according to the moment and/or the place where the user requested it.

As mentioned previously, the geographical position 148 of the user can be entered manually or preselected in the manner of watches indicating several towns with the difference in relation to Greenwich Mean Time, i.e. if the user is located in Biel, the user will choose the place closest to his position on the dial of his watch, such as for example Geneva, and, when he requests display of the lunation, the display device will, by means of said at least one first driver, drive said at least one first indicator member 110 and/or said at least one second indicator member 120 so as to show the lunation corresponding to the date 146, to the time 147 and to the geographical position 148.

Figure 5:
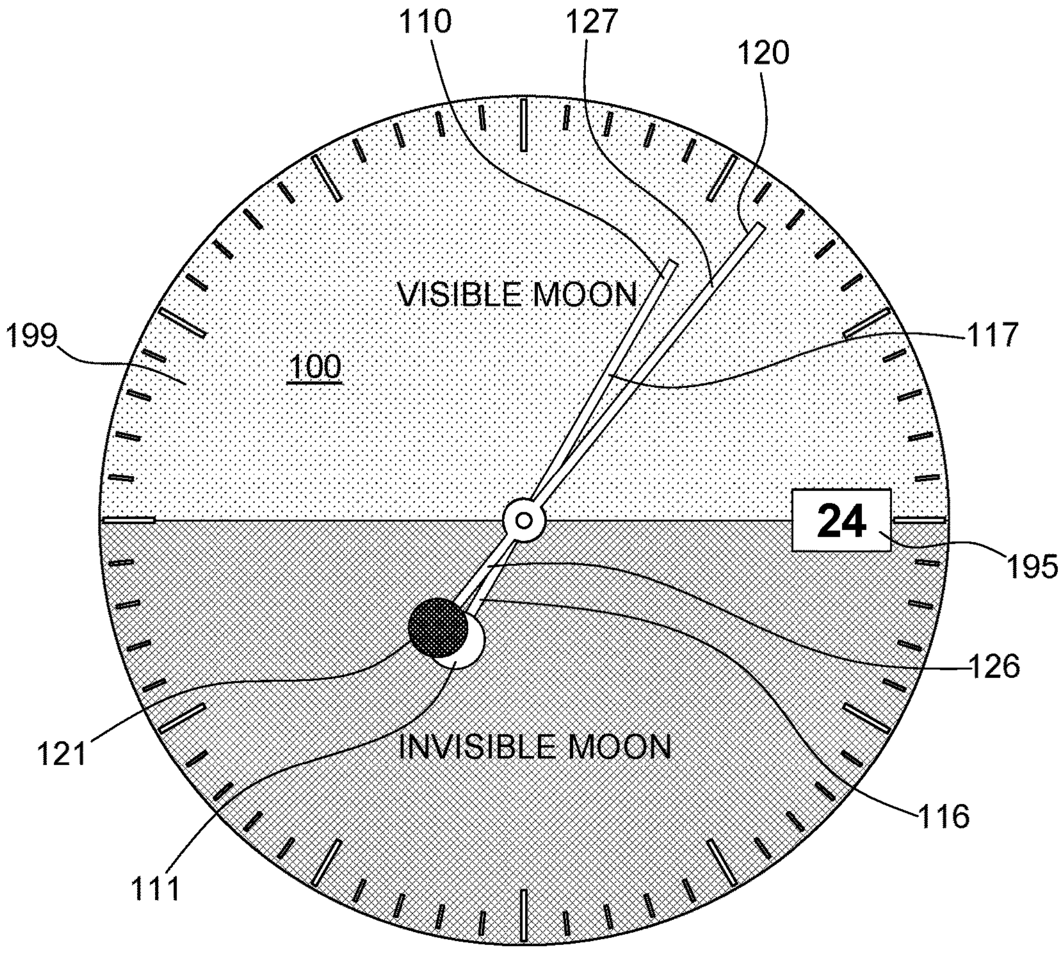
FIG. 5 discloses a phase of the moon in a hemisphere according to one embodiment.

FIG. 5 shows the display device 100 in which the dial is separated into two parts so as to show the lunations in the northern hemisphere and/or in the southern hemisphere, when said at least one representation of the moon 111 and at least one occulting element 121 are superimposed.

Indeed, in addition to the phase, the position of the moon with respect to the horizon line can be placed between 9 o'clock and 3 o'clock on the dial or on the glass of the watch, as shown in FIG. 5.

The horizon line can be calculated and adapted for a particular place required by the user, taking the relief in proximity to the user, and displayed on a screen serving as a dial. Above the horizon the moon may be visible, below it may be invisible. The position of the moon may give information on the time that the moon rises or sets for example.

Advantageously, by means of said at least one first driver and said at least one control unit, said at least one representation of the moon 111 and at least one occulting element

121 can move in the clockwise direction to show the path of the moon in the northern hemisphere and in the anticlockwise direction in the southern hemisphere.

The invention claimed is:

1. A display device (100) for a timepiece; said display device (100) comprising:

a first indicator member (110) mounted so as to be able to move and, comprising a representation of the Moon (111) provided thereon;

a second indicator member (120) mounted so as to be able to move and comprising an occulting element (121) provided thereon and configured for occulting said representation of the Moon (111);

a driver configured for driving said first indicator member (110) and/or said second indicator member (120); and a controller configured for controlling, according to a set of data (141), said first driver so as to drive and/or to superimpose said first indicator member (110) and/or said second indicator member (120) so that said representation of the Moon (111) is completely or partially occulted by said at least one occulting element (121), wherein said first indicator member (110) is one of an hour hand and a minute hand and said second indicator member (120) is an other of the hour hand and minute hand.

2. The display device (100) according to claim 1, wherein said controller is configured for controlling said driver at the request of the user.

3. The display device (100) according to claim 1, wherein said set of data (141) comprises at least:

a date (146);

a time (147); and/or a geographical position (148).

4. The display device (100) according to claim 3, wherein the set of data (141) is configured for being received by said controller via communication by radio frequency, via satellite geopositioning, and/or via wireless and/or light communication.

5. The display device (100) according to claim 1, wherein said driver includes a first driver configured for driving said first indicator member and a second driver configured for driving said at least one second indicator member (120).

6. The display device (100) according to claim 5, wherein said controller being configured for controlling said first driver so as to drive said first indicator member (110) completely or partially under said second indicator member (120) so that said representation of the Moon (111) is completely or partially occulted by said occulting element (121), or so as to drive said second indicator member (120) completely or partially above said first indicator member (110) so that said representation of the Moon (111) is completely or partially occulted by said occulting element (121).

7. The display device (100) according to claim 5, wherein said first indicator member (110) is configured for being able to move about a first rotation axis and comprises a first proximal end (116) close to said first rotation axis and/or a first distal end (117) distant from said first rotation axis, and/or wherein said second indicator member (120) is configured for being able to move about a second rotation axis and comprises a second proximal end (126) close to said second rotation axis and/or a second distal end (127) distant from said second rotation axis; said representation of the Moon (111) being at said first distal end (117) or at said first proximal end (116) and/or said occulting element (121) being at said second distal end (127) or at said second proximal end (126).

8. The display device (100) according to claim 5, wherein said first indicator member (110) or said second indicator member (120) is configured for indicating the age of the Moon.

9. The display device (100) according to claim 5, further comprising a second hand indicating the age of the Moon and being configured for being driven by said driver, said second driver and/or by a third driver.

10. The display device (100) according to claim 1, wherein said representation of the Moon (111) is configured for being lighter than said occulting element (121), and/or said occulting element (121) and/or said representation of the Moon (111) has or have a rounded, round, elliptical, disc and/or spherical shape.

11. The display device (100) according to claim 1, wherein said occulting element (121) comprises an opening (122) configured for completely or partially revealing said representation of the Moon (111).

12. The display device (100) according to claim 1, wherein said representation of the Moon (111) and/or said occulting element (121) comprises, or comprise, a polarised material with a mirror, semi-transparent and/or transparent effect.

13. The display device (100) according to claim 12, wherein said representation of the Moon (111) comprises a material that is shiny, reflective, luminescent and/or photoluminescent and/or said occulting element (121) comprises a material that is matt or photoabsorbent.

14. The display device (100) according to claim 1, wherein said representation of the Moon (111) and/or said occulting element (121) comprises, or comprise, a liquid crystal, electrochromic and/or electrowetting display configured for modifying the transparency of said representation of the Moon (111) and/or of said occulting element (121) so that, when said representation of the Moon (111) and said occulting element (121) are superimposed, a representation of the lunar phase appears to the observer.

* * * * *